G. W. VOSE.
AUTOMOBILE WHEEL LOOSENER.
APPLICATION FILED APR. 18, 1919.
1,324,704. Patented Dec. 9, 1919.
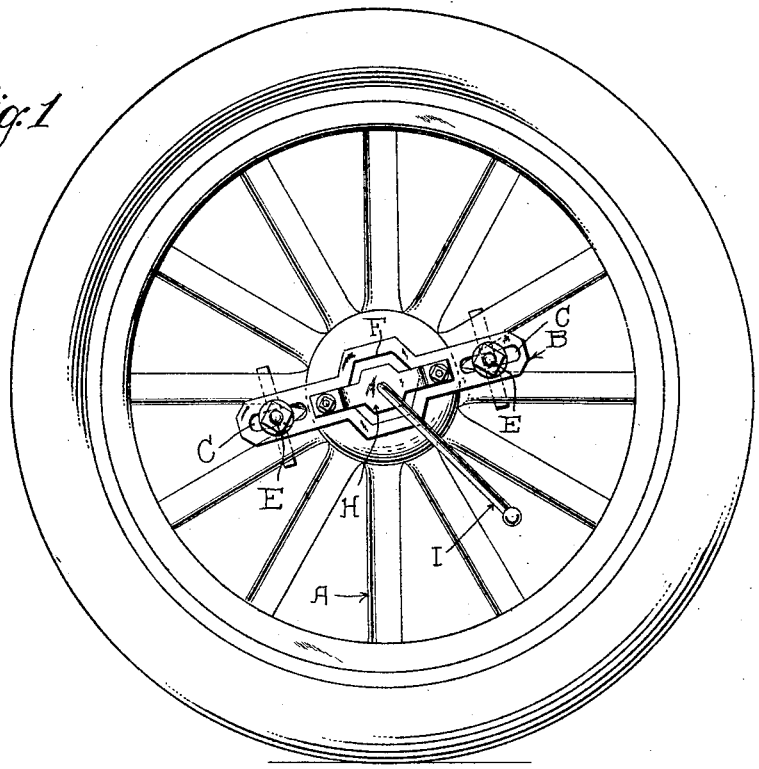
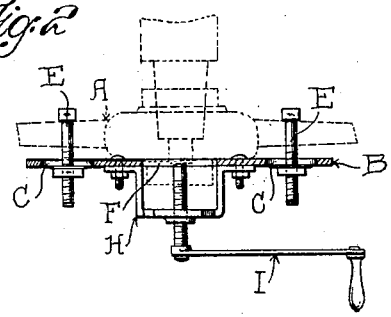
Inventor
Grant W. Vose
By Franklin N. Hough
Attorney

UNITED STATES PATENT OFFICE.

GRANT W. VOSE, OF OLETA, CALIFORNIA.

AUTOMOBILE-WHEEL LOOSENER.

1,324,704.        Specification of Letters Patent.        Patented Dec. 9, 1919.

Application filed April 18, 1919. Serial No. 291,067.

*To all whom it may concern:*

Be it known that I, GRANT W. VOSE, a citizen of the United States, residing at Oleta, in the county of Amador and State of California, have invented certain new and useful Improvements in Automobile-Wheel Looseners; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in wheel looseners for automobiles, and consists of a simple and efficient means whereby a wheel in the event of its being held by friction or otherwise may be loosened when desired to remove the same.

My invention consists of a simple and efficient device of this character having various details of construction, combination and arrangement of parts which will be hereinafter fully described, shown in the accompanying drawings and then specifically defined in the appended claim.

My invention is illustrated in the accompanying drawings, which, with the letters of reference marked thereon form a part of this application, and in which:

Figure 1 is an elevation showing the application of my invention to an automobile, and Fig. 2 is a central longitudinal vertical sectional view through the same.

Reference now being had to the details of the drawings by letter:

A designates an automobile wheel of the usual construction, and B is a plate having slots C therein through which the screws E are passed having T-shaped ends adapted to engage behind the spokes in the manner shown, and each screw has a nut thereon. Said screws are passed between the spokes and one through each of said slots, after which the nuts are applied, thus securely fastening the plate to the wheel. The end of the hub extends through the opening F, and H is a bracket member fastened to the plate B and has an offset part which is provided with a threaded aperture adapted to receive the threaded end of the crank handle I which is adapted to bear against the end of the axle projecting through the hub.

In applying the device the plate is clamped to the wheel, in the manner shown, and by turning the crank, the threaded end thereof will bear against the axle and as the plate carrying the crank handle is stationary, the wheel will be drawn outward upon the axle, thus loosening the same and facilitating its removal.

What I claim to be new is:

A device for loosening wheels upon axles comprising a plate having a central angular outlined opening, and longitudinal slots one on either side of the opening, a U-shaped bar spanning said opening and having angled ends fastened to said plate upon either side of the opening, said U-shaped bar having a central aperture which is threaded, and a screw engaging said threaded aperture, and a handle fixed to the screw, T-bolts passing through said longitudinal slots and having threaded portions adapted to engage spokes of a wheel, and nuts upon said T-bolts.

In testimony whereof I hereunto affix my signature in presence of two witnesses.

GRANT W. VOSE.

Witnesses:
     I. P. OSTROM,
     E. A. LAWRENCE.